United States Patent [19]
Bibbiani et al.

[11] Patent Number: 5,725,296
[45] Date of Patent: Mar. 10, 1998

[54] LIGHT HEAD ASSEMBLY WITH REMOTE LIGHT SOURCE

[75] Inventors: Stephen C. Bibbiani, Deep River; Harold W. Lyons, Killingworth, both of Conn.

[73] Assignee: Whelen Engineering Company, Inc., Chester, Conn.

[21] Appl. No.: 714,450

[22] Filed: Sep. 16, 1996

Related U.S. Application Data

[62] Division of Ser. No. 574,278, Dec. 18, 1995, Pat. No. 5,139,153.
[51] Int. Cl.⁶ .................................................. F21V 8/00
[52] U.S. Cl. ............................. 362/32; 362/300; 362/302
[58] Field of Search ........................... 362/32, 297, 298, 362/307, 346, 255, 256, 347, 300, 302

[56] References Cited

U.S. PATENT DOCUMENTS 1,519,209 12/1924 McElroy ............................ 362/346
5,438,485 8/1995 Li et al. ............................ 362/298

FOREIGN PATENT DOCUMENTS 83245 5/1964 France ............................ 362/297

Primary Examiner—Y. My Quach
Attorney, Agent, or Firm—Alix, Yale & Ristas, LLP

[57] ABSTRACT

A light head assembly for directing light generated by a remote light source and transmitted through a light pipe. The light head assembly has at least one optic deflector with a convex reflective surface for intercepting and redirecting the light beam emitted from the end of the light pipe. The thus redirected light is incident upon a larger primary reflector having a concave reflective surface which subsequently redirects the light toward the ambient environment. The optic deflector is supported at a desired distance from, and with an appropriate orientation to, the end of the associated light pipe so as to substantially eclipse the beam of light discharged from the light pipe.

9 Claims, 3 Drawing Sheets

LIGHT HEAD ASSEMBLY WITH REMOTE LIGHT SOURCE

This is a divisional of application Ser. No. 08/574,278, filed on Dec. 18, 1995, now U.S. Pat. No. 5,139,153.

BACKGROUND OF THE INVENTION

1. Field of the Invention

The present invention relates to the creating of a desired light dispersion pattern using light transmitted from a remote source by fiber optics. More particularly, the present invention relates to a novel light head assembly for dispersing light generated by a remote light source, especially a high intensity discharge (HID) source, and transmitted to the light head assembly through one or more optical fibers. Accordingly, the general objects of the present invention are to provide novel and improved methods and apparatus of such character.

2. Description of the Related Art

Attempts to achieve area illumination using light generated by a remotely located light source and transmitted to a light head assembly via fiber optics are known in the art. However, to date, most light head assemblies designed for use with remote light sources have been mere variations on a single basic design configuration. This basic configuration employs a symmetric concave housing having an aperture within a central region thereof and a light transmissive lens which cooperates with the concave housing to define a chamber therebetween. An optical fiber or bundle of fibers, commonly known as a light pipe, extends from the remote light source to the light head and transmits the light generated by the remote source to the light head housing. The light pipe projects through the aperture in the light head housing in a direction which is parallel to the axis of symmetry of the housing and terminates within the chamber of the housing. Since the intensity of the light emitted from the end of a light pipe decreases rapidly as the viewer moves off-axis, and the light emitting end of a light pipe is effectively a very small diameter light source, the prior art employs a lens with a complex pattern of light refracting elements in an attempt to achieve a desired pattern of dispersion of light passing through the lens into the ambient environment.

The use of a light pipe as the light source in a head assembly offers a number of advantages over light head assemblies employing conventional "point" light sources, such as gaseous discharge tubes or high intensity incandescent lamps. Among these advantages are the absence of high temperatures and the elimination of the possibility of electric sparks within the light head assembly. The absence of high temperatures within the light head assembly allows the components of the light head to be fabricated from comparatively inexpensive low temperature plastic materials.

However, despite the significant potential benefits offered by light head assemblies designed for use with fiber optic cables and remotely located light sources, such assemblies have not found widespread utility due to a number of inherent deficiencies. The principal deficiency, as noted above, arises from the fact that a light pipe defines a very small area light source and the intensity of that source decreases rapidly off-axis. For example, in one commercially available optical fiber, approximately ninety (90%) percent of the available light may be measured within twenty five (25%) degrees of the axis of the light pipe. Thus, the area illuminated by a closely spaced light pipe is far too small in cross-section to serve as a spot or warning light. Accordingly, light head assemblies which employ a light pipe as the source of light must employ some means of improving light dispersion.

Previous attempts to control the dispersion of light emanating from a light pipe have resulted in light head assemblies with several deficiencies. As a first deficiency, previously available light head assemblies of this nature have employed relatively complex lenses to refract the light emitted from the end of the light pipe. In addition to being expensive, the use of such a lens results in a comparatively high degree of attenuation. A second deficiency of previously available light head assemblies which receive light from an associated light pipe resides in their elongated shape, i.e., their depth in the direction of travel of the light rays. Thus, in an effort to increase the area illuminated, previously available light head assemblies have spaced the emitting end of the light pipe a substantial distance from the refracting lens. While such spacing improves light dispersion, it also results in a volumetrically inefficient device. Light head assemblies employing such elongated housings are impractical for flush mounting on walls or for use where the space behind the supporting wall is severely limited such as, for example, in the case of a dome light in a vehicle. This problem is exacerbated because these light head assemblies receive the light pipe from the rear of the assembly such that the axis thereof, and thus the axis of the emitted light beam, is oriented substantially parallel to the elongated dimension of the light head housing. Since the relatively fragile nature of optical fibers dictates that the light pipe be routed to prevent tight bends, substantial additional depth is required to mount these light head assemblies to a mounting structure. Thus, light head assemblies which employ a light pipe as the light source have found application in a very limited number of environments.

SUMMARY OF THE INVENTION

The present invention overcomes the above-discussed and other deficiencies of the prior art by providing novel and improved light head assemblies for manipulating light received from a light pipe to produce illumination patterns as desired. Light head assemblies in accordance with the invention are characterized by uncomplicated construction, by being economic to manufacture, and by being compact enough to allow installation in a wide variety of environments.

It is, accordingly, a principle object of the present invention to provide a light head assembly for redirecting and focusing light generated by a remote light source and transmitted to the assembly through a light pipe.

It is a further object of the present invention to provide a light head assembly which includes a simulated light source, the simulated source deriving energy in the visual spectrum from a remote light source, the energy being transmitted to the head assembly through a light pipe.

It is yet another object of the present invention to provide a light head assembly for directing light generated by a remote light source, and transmitted to the head assembly through a light pipe, which is of uncomplicated construction, inexpensive, can be installed in a wide variety of environments and which provides maximum intensity and/or light dispersion for the size of the light head.

These and other objects and advantages of the present invention are provided by a light head assembly having an optic deflector which emulates a conventional light source. The optic deflector redirects, and substantially increases the angle of divergence of, the light emitted from the end of a light pipe. The light thus redirected is reflected by a larger, primary reflector having a concave reflective surface(s) facing the deflector. The primary reflector receives diverging light rays from the optic deflector and redirects the light toward the ambient environment. The optic deflector includes a convex reflective surface shaped to cause the desired illumination of the primary reflector. The deflector is supported at a desired distance from, and with an appropriate orientation with respect to, the end of the light pipe. In one embodiment, the support is provided by a light transmissive lens and the deflector is located between the lens and the discharge end of the light pipe. The deflector is sized to eclipse the light beam emitted from the end of the light pipe, i.e., substantially all of the light directed into the primary reflector is incident on the optic deflector. The concave primary reflector serves as the light head housing and includes a structure for fixedly receiving and orienting the light pipe such that light emitted from the end of the light pipe is intercepted by the deflector. The light reflected from the optic deflector is "focused" by either, or both of, the primary reflector and lens to produce the desired radiation pattern.

In a second embodiment of the present invention, an additional reflector is positioned between the discharge end of the light pipe and the reflective surface of the optic deflector. The primary reflector preferably has a concave reflective surface which is symmetric about an axis. Optimally, the additional reflector has a reflective surface which is symmetric about another axis oriented in a direction of about 45° to the axis of symmetry of the primary reflector. Such a configuration allows the light pipe to be mounted behind the light head assembly with a substantially perpendicular orientation with respect to the axis of symmetry of the concave primary reflector. As with the embodiment discussed above, the deflector may be supported in the desired position and with the desired orientation relative to the end of the light pipe by a light transmissive lens. In this second embodiment, light emitted from the end of the light pipe is directed by the additional reflector to the deflector. The deflector intercepts the light from the additional reflector and redirects it, in a diverging pattern, toward the primary reflector. The light is then intercepted by the primary reflector and redirected into the ambient environment. Since this embodiment minimizes the overall thickness of the light head assembly, it is particularly well suited for installation where space, particularly depth, is a major consideration.

The present invention neither requires the use of a refracting lens nor the use of an elongated light head housing to create the desired light dispersion pattern. Rather than reliance solely upon refractance, the present invention employs a series of steps of engineered reflection to emulate the performance of a light having which includes a "hot" light source. The critical step of reflection, i.e., the creation of a simulated light generator mounted within the light head assembly, is accomplished through the use of a relatively small convex light deflector which is positioned close to, and facing, the discharge end of the light pipe. The deflector is optically designed to spread light which is incident thereon over substantially the entire surface of a larger, typically generally concave, primary reflector. The light is then redirected by the reflective surface of the primary reflector toward the ambient environment. To form a spotlight in accordance with the present invention, the reflective surface of the concave reflector defines, in substantial part, a paraboloid of revolution. To form a floodlight in accordance with the present invention, the reflective surface of the concave reflector defines a surface of virtually any other shape, e.g., a plurality of paraboloids of revolution having different focal lengths. While a light transmissive lens is preferably used to support the deflector at an appropriate position relative to the primary reflector and light pipe, the lens need not, but may, be formed to aid light dispersion. The deflector support may, alternatively, be some type of non-transmissive structure, such as an arm or a web, as long as the deflector is fixedly positioned to intercept light emitted from the light pipe and the support does not overly obstruct the light. The present invention may employ an additional reflector between the end of the light pipe and the deflector to enable the light pipe to be routed substantially parallel to the plane of the surface on which the light head assembly is mounted.

The present invention also encompasses embodiments wherein a plurality of light pipes are terminated in a single light head assembly. The plurality of light pipes can either be positioned to direct light toward a single convex deflector or, optionally, can be positioned to direct light toward a plurality of optic deflectors. Regardless of the number of optic deflectors used, however, the deflectors serve to intercept light emitted from the light pipes and redirect the intercepted light toward another reflector which subsequently redirects the light into the ambient environment.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENTS

Figure 1:
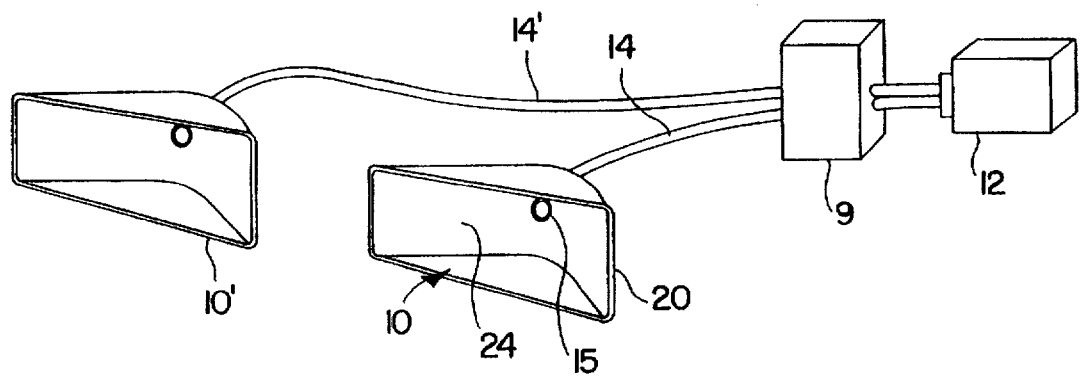
FIG. 1 is a schematic perspective view of a typical application of two light head assemblies in accordance with a first embodiment of the present invention, the light heads being only partially shown.
Figure 2:
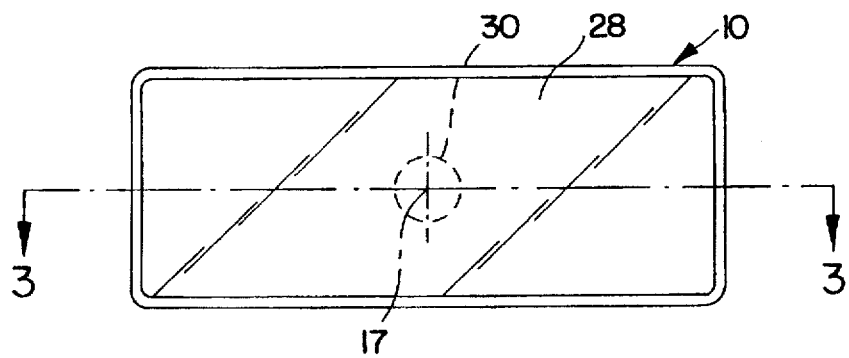
FIG. 2 is a front elevation view of one of the partialy shown light head assemblies of FIG. 1.
Figure 3:
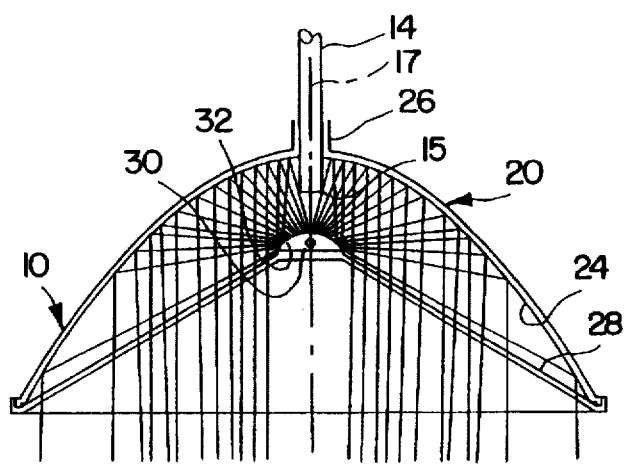
FIG. 3 is a cross-sectional schematic view of a complete light head assembly in accordance with the first embodiment of the invention.

With joint reference to FIGS. 1–3, a light head assembly 10 in accordance with the present invention includes at least an optic deflector 30, a primary reflector 20, a support 28 for deflector 30, and means 26 for receiving a light pipe 14. Primary reflector 20 generally serves as the light head housing and has a reflective surface 24 on one side thereof. In the embodiment of FIGS. 1–3, deflector 30 is in tile form of a convex reflector and reflective surface 24 of primary reflector 20 is concave and symmetric about an axis 17. The light pipe receiving means 26 is integrally formed with primary reflector 20 such that the discharge end 17 of light pipe 14 is oriented coaxial to axis 17 when light pipe 14 is secured within light pipe receiving means 26.

Support 28 positions deflector 30 at an appropriate distance from, and with an appropriate orientation with respect to, the end 15 of light pipe 14. Deflector 30 has reflective surface 32 on the side thereof which faces the end 15 of the light pipe 14. The size, position and configuration of deflector 30 are chosen to ensure that deflector 30 intercepts substantially all of the beam of light emitted from the end 15 of light pipe 14. Substantially all of the light which is incident on reflective surface 32 of deflector 30 will, in turn, be reflected toward primary reflector 20.

As shown in FIG. 3, support 28 can function as a light transmissive lens which cooperates with primary reflector 20 to define a chamber therebetween. Alternatively, support 28 can be a web-like member and a separate lens, for example a lens which defines a plane transverse to axis 17, may be provided to define the chamber if deemed necessary or desired.

The various components of light head assembly 10 can be made of a wide variety of known materials but are preferably formed of inexpensive, low temperature plastics. Reflective surfaces 24 and 32 can be formed by any of the many known methods and materials, but are preferably formed by metallizing the plastic components.

In the embodiment shown in FIGS. 1–3, light head assembly 10 is configured to function as a spotlight. Accordingly, reflective surface 24 of reflector 20 at least partially defines a paraboloid of revolution. By properly shaping and locating deflector 30 so that it encompasses the focal point of reflector 20, light redirected by deflector 30 onto reflector 20 will be reflected through lens/support 28 as rays which are substantially parallel to axis 17.

In a typical application, a single remote light source 12 will supply light to multiple light pipes 14, 14', the light pipes being coupled at one end thereof to light source 12 with the other ends thereof terminating at respective light head assemblies 10 and 10'. Remote light source 12 will be a high intensity, continuous source, such as a metal halide lamp, or any equivalent thereof. Each of the light pipes 14, 14' will consist of a bundle of optical fibers, a single "large" diameter optical fiber or any equivalent thereof. To illuminate an area using light head assembly 10, remote light source 12 generates light which is transmitted through light pipe 14 and emitted from end 15 of light pipe 14. Reflective surface 32 of deflector 30 intercepts the light emitted from the end 15 of light pipe 14 and reflects the light toward concave reflective surface 24 of primary reflector 20. Reflector 20 subsequently redirects the light into the ambient environment. Support 28, or a separate outwardly disposed lens, may be provided with light refracting elements for collimating light passing therethrough in the spotlight application. Thus, support 28 may cooperate with deflector 30 and reflector 20 to produce, from the small and slightly diverging light beam emitted from light pipe 14, the desired illumination pattern.

Figure 4:
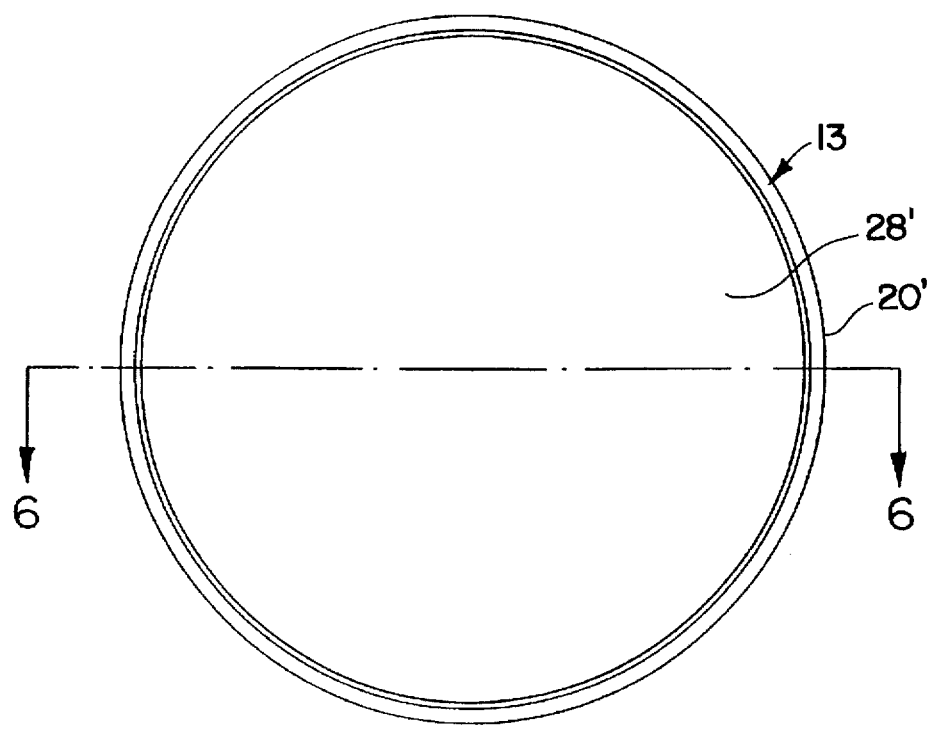
FIG. 4 is a front view of a light head assembly in accordance with another embodiment of the present invention.
Figure 5:
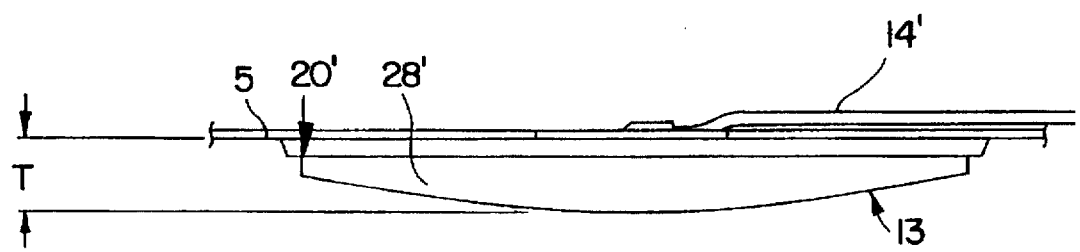
FIG. 5 is a side elevation view of the light head assembly of FIG. 4.
Figure 6:
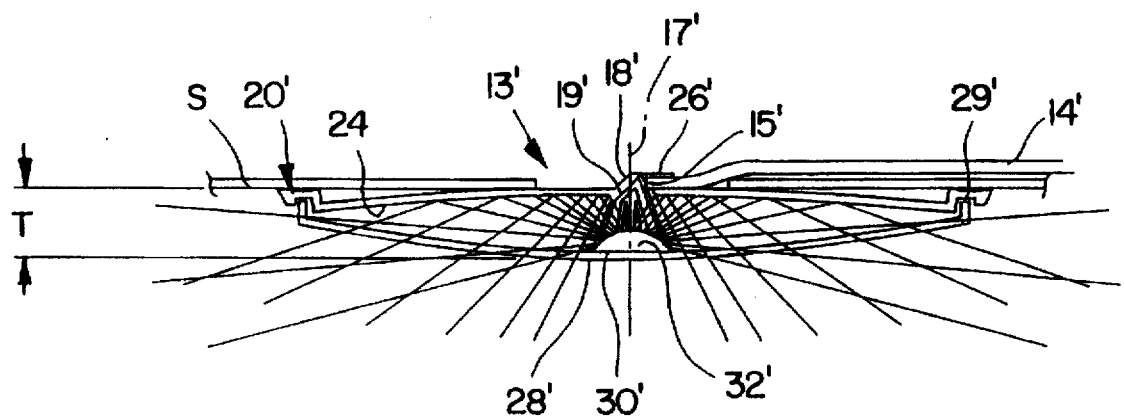
FIG. 6 is a cross-sectional schematic view, taken along line A—A of FIG. 4, of the light head assembly of FIGS. 4 and 5.

FIGS. 4–6 depict another embodiment of the present invention. In this embodiment the light head assembly 13 is generally similar to light head assemblies 10 and 10' shown in FIGS. 1–3. However, light head assembly 13, in addition to a deflector 30' and a primary reflector 20' includes a reflector 18'. In FIGS. 5 and 6, light head assembly 13 is mounted to a substantially planar support surface S. Light pipe 14' is routed to light head assembly 13 in a direction which is generally parallel to the plane of surface S, i.e., perpendicular to the axis of symmetry 17' of reflector 18', and is fixedly received within receiving member 26' of light head assembly 13. Support 28' is shown as a light transmissive lens which is mounted to primary reflector 20' near the perimeter thereof in any suitable manner such as, for example, by means of an adhesive bead 29'. When mounted to surface S, light head assembly 13 projects outwardly from surface S a relatively small distance, i.e., by light head thickness T.

In the embodiment of FIGS. 4–6, the reflective surface 32' of deflector 30' is generally symmetric about axis 17'. Reflector 18' has a planar reflective surface 19' on the side thereof which faces light pipe 14'. Reflective surface 19' is tilted at an angle of approximately 45° with respect to both the axis of symmetry 17' of reflector 20' and the axis of the light beam emitted from the end 15' of light pipe 14'. Due to the orientation of surface 19', light incident thereon is redirected toward reflective surface 32' of deflector 30'. Reflective surface 32' subsequently redirects the light in the form of diverging light rays toward reflective surface 24' of primary reflector 20'. The light intercepted by reflective surface 24' is then redirected into the ambient environment. In the embodiment of FIGS. 4–6, reflective surface 24' of primary reflector 20' will be shaped, in the manner known in the art, to produce wide angle illumination. Thus, light reflected toward the ambient environment by reflective surface 24' is particularly well suited for use as a scene light, i.e., to provide wide area illumination. Such a light may, for example, be employed to illuminate the interior of an ambulance. Since the overall thickness of light head assembly 13 is generally much less than the overall thickness of previously available light head assemblies, this embodiment is well suited for shallow mounting applications such as in the head liner of a vehicle.

As shown in the Figures, deflector 30 will preferably be sized to eclipse the light source, i.e., to intercept substantially all of the light beam which enters the "chamber" defined in part by reflector 20. In actual practice at least ninety (90%) percent of the light emitted from the end of the light pipe 14 will be incident upon deflector 30. When the primary reflector 20 has an axis of symmetry, that axis will typically pass through deflector 30 and the focal point(s) F of the primary reflector will typically be coincident and lie on the axis. The focal point or coincident focal points will also typically fall within the volumn of deflector 30. Thus, the diverging light reflected from surface 32 of deflector 30 will appear to the primary reflector as light being emitted from a conventional "hot" light source having its filament passing through the common focal point of the primary reflector or a gaseous discharge tube having its discharge region centered on the common focal point.

Since the presence of deflector 30 interferes with some of the light reflected by primary reflector 20, thereby creating a dead spot in the illumination pattern, it may in some applications be preferable to minimize the size of the deflector 30. This can be accomplished by placing deflector 30 close to the discharge end 15 of light pipe 14 and designing reflective surface 32 of deflector 30 to provide a wide angle of dispersion. Alternatively, deflector 30 may be provided with one or more transparent regions through which light may pass, i.e., deflector 30 may also function as a lens through which a portion of the light emitted from discharge end 15 of light pipe 14 may pass.

Figure 7:
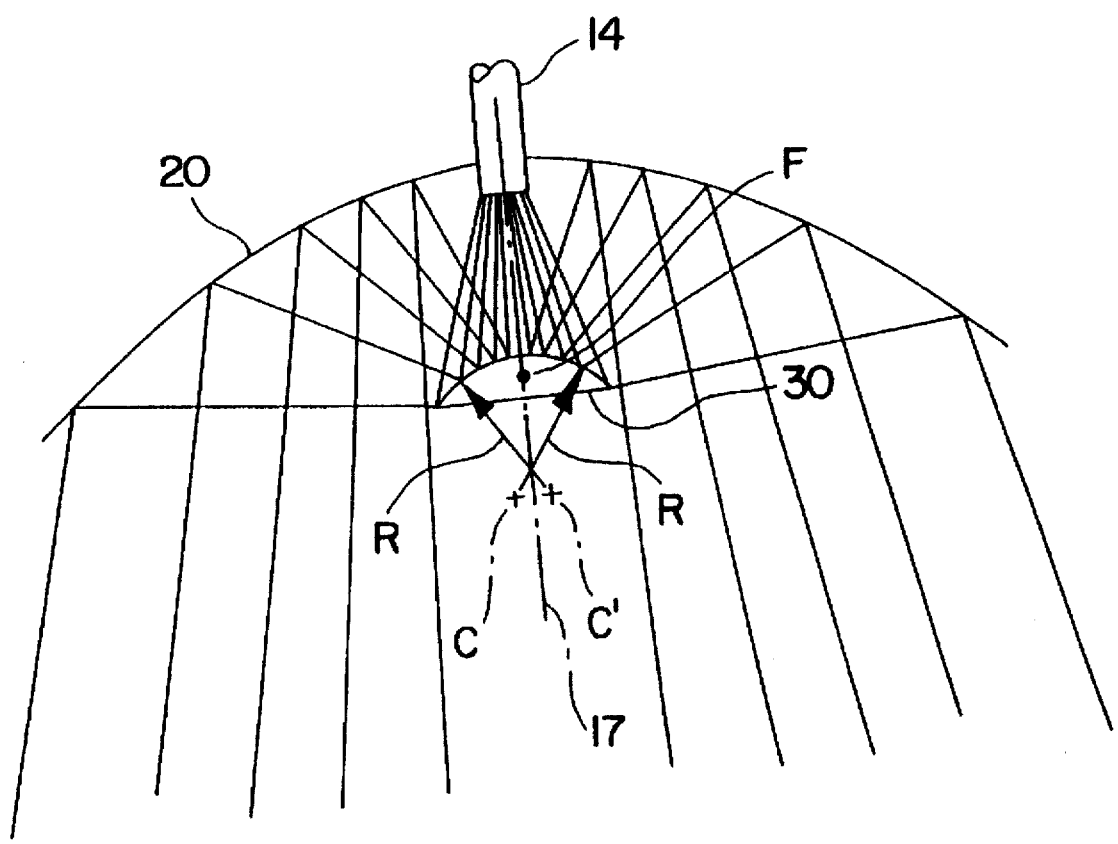
FIG. 7 is an elarged view which depicts details of a preferred embodiment of an optic deflector for use in the practice of the present invention.

The shape of reflective surface 32 will be determined by the particular light dispersion pattern desired and thus will be a function of the position of the deflector relative to the source, i.e., the end of the light pipe or the additional mirror 30', and the shape of the primary reflector. For example, to form a scene light in accordance with a preferred embodiment of the present invention, deflector 30 is preferably positioned close to the central aperture in primary reflector 20 and reflective surface 32 is symmetric about axis 17. Referring to FIG. 7, in one reduction to practice, surface 32 was a composite of at least two convex surfaces having the same radius, but with different points of origin C, C', these points of origin being displaced from axis 17. One or more deflectors 30 can be positioned off-center with respect to axis of symmetry 17 of reflective surface 24 and receive light from one or more light pipes 14. In such a case each reflective surface 32 of each deflector 30 will preferably be asymmetric to assure light distribution over substantially the entire reflective surface 24.

The present invention can also be used in conjunction with a device for interrupting and/or colorizing the source light. Referring again to FIG. 1, the interruption device 9 is located along the length of light pipes 14 and 14' and operates on the light as it travels from remote light source 12 toward light head assemblies 10 and 10'. The interruption device, which for example can be a color wheel or "chopper", periodically interrupts the light travelling through light pipes 14 and 14' either alternately or simultaneously. The resulting effect is that light head assemblies 10 and 10' periodically flash to simulate strobe lights such as those widely used in emergency vehicles.

It is to be understood that the invention is not limited to the illustrations described and shown herein. It will be readily appreciated by those of ordinary skill in the art that the invention is susceptible of modification of form, size, arrangement of parts and details of operation. The invention is thus intended to encompass all such modifications which are within the scope and spirit of the appended claims.

What is claimed is:

1. A light head comprising:
    a primary reflector, said primary reflector having a peripheral edge and a concave reflective surface which extends generally in a first direction from said edge, said edge defining a plane, at least a portion of said concave reflective surface having a focal point and being defined by a surface of revolution about an axis, said focal point being intersected by said axis and being located on a side facing said reflective surface; and
    means for simulating a light source located at said focal point, said light source simulating means including:
        a three dimensional body having a volume and a convex reflective surface, said convex reflective surface including at least two contiguous portions which generally face in the direction of said primary reflector concave reflective surface, each of said contiguous portions of said convex reflective surface having a radius, said radii being the same and having different points of origin, said points of origin being displaced from said focal point of said portion of said concave reflective surface of said primary reflector;
        means for projecting a beam of light into said primary reflector, said beam having an axis; and
        a support for said three dimensional body, said support positioning said three dimensional body on a same side of said plane as said focal point of said portion of said concave reflective surface of said primary reflector and in spaced relation to said primary reflector concave reflective surface, said support also positioning said three dimensional body to substantially eclipse said beam of light emanating from said beam projecting means, said support further orienting said three dimensional body such that an eclipsed beam of light will be incident on said portions of said convex reflective surface and will be reflected thereby to said primary reflector as diverging light rays.

2. The light head of claim 1 wherein said projecting means is positioned such that the axis of said beam emanating from said projecting means is coaxial with said axis of said portion of said concave reflection surface of said primary reflector.

3. The light head of claim 1 wherein said support includes a lens and means fixing said lens to said edge of said primary reflector.

4. The light head of claim 1 wherein said light beam projecting means comprises:
    a metal halide lamp; and
    at least a first optical fiber for transmitting light from said lamp to said primary reflector, transmitted light being emitted as a beam from an end of said optical fiber, at least ninety percent of the light emitted from said end of said optical fiber being directly incident upon said contiguous portions of said convex reflective surface of said three dimensional body.

5. The light head of claim 1 wherein said three dimensional body has said volume and said focal point of said portion of said concave reflective surface of said primary reflector lies within said volume of said three dimensional body.

6. The light head of claim 5 wherein said axis of said portion of said concave reflective surface is coaxial with the axis of said beam of light emanating from said projecting means.

7. The light head of claim 6 wherein said plane defined by said peripheral edge of said primary reflector is oriented generally transverse to said axis of said portion of said concave reflective surface.

8. The light head of claim 7 wherein said support includes a lens and means fixing said lens to said edge of said primary reflector.

9. The light head of claim 1 wherein said plane defined by said peripheral edge of said primary reflector is oriented generally transverse to said axis of said portion of said concave reflective surface.

* * * * *

UNITED STATES PATENT AND TRADEMARK OFFICE
CERTIFICATE OF CORRECTION

PATENT NO. : 5,725,296
DATED : March 10, 1998
INVENTOR(S) : Stephen C. Bibbiani et al It is certified that error appears in the above-identified patent and that said Letters Patent is hereby corrected as shown below:

On title page, at [62], change "5,139,153" to --5,639,153--.

Column 1, line 5, change "5,139,153" to --5,639,153--.

Column 8, line 19, change "reflection" to --reflective--.

Signed and Sealed this

Sixteenth Day of June, 1998

Attest:

BRUCE LEHMAN

Attesting Officer     Commissioner of Patents and Trademarks